United States Patent Office 3,519,107
Patented July 7, 1970

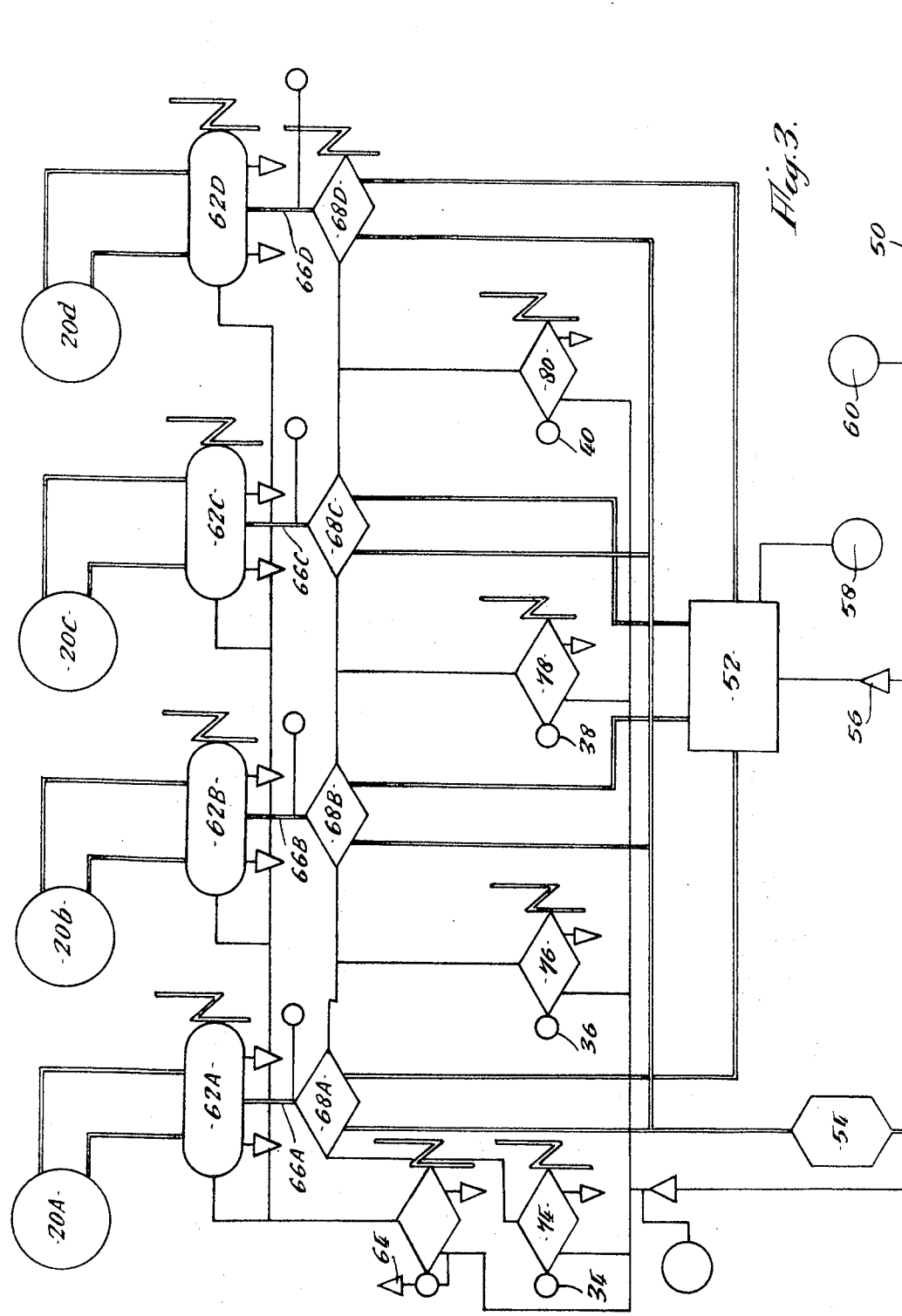

3,519,107
RAILWAY TRACK BRAKE RETARDERS
Ronald Bellinger, Bristol, England, assignor to Strachan & Henshaw Limited, Bistol, England, a company of Great Britain and Northern Ireland
Filed July 2, 1968, Ser. No. 741,938
Int. Cl. B61k 7/08
U.S. Cl. 188—62         7 Claims

ABSTRACT OF THE DISCLOSURE

A railway track retarder and method of operation thereof including movable friction members arranged along said track for squeezing a vehicle wheel therebetween, a plurality of power operated actuating members connected to said movable friction members and arranged in spaced relation along said friction members, a source of power, a connection between said source of power and each said actuating member, control mechanism in each said connection and a plurality of wheel-position-sensing devices along said track connected with said control mechanisms and arranged to effect the method of applying progressively along said track more pressure to the friction members behind each wheel than in front thereof.

The source of power may be compressed air, the power operated actuating members each including a piston and cylinder assembly and the connection to the source of power including an air valve connected with the wheel-position-sensing means.

---

This invention relates to railway track brake retarders of the kind hereinafter termed squeezer retarders in which the rim of a wheel of a vehicle running on a track is frictionally contacted on its two side faces by friction surfaces of clamping members which are pressed together by clamping means externally of the vehicle in order to retard the progress of the vehicle. Such devices are to be found (at wagon marshalling yards) where vehicles being shunted are allowed to accelerate down a slope. As the weights of the wagons and their running characteristics vary considerably so does the acceleration and the kinetic energy stored and some form of control device is required so that the final speed of the wagon can be limited to that which is just sufficient to carry it to the desired destination since if its speed is too great the contents could be damaged unduly when it comes into contact with the preceding wagon in the train of wagons being assembled. Such retarders must also be capable of bringing wagons to a halt as for example under a loading boom.

Such devices present certain design problems. In known constructions pressure is applied substantially equally throughout the length of the retarder. One of the difficulties associated with this type of retarder is the tendency for the wheel to lift from between the clamping members. This makes the problem particularly difficult as the maximum safe braking effort that can be applied to a wagon will depend on its weight and consequently this is usually determined by the lightest wagon normally expected and the device is not used to capacity.

A further difficulty occurs in getting the wheel into the retarder as should the operator close the retarder too early the wheel must force the retarder open from its closed position by a lead-in which means that the front edge of the wheel only is in contact with the braking members and this may cause the wheel to lift even at low squeeze pressures and low wagon speeds. To allow the wheel to enter without lifting, the squeeze pressure would have to be so low that braking would be negligible.

One of the objects of the present invention is to provide and improved form of "squeezer retarder" retarding device which will overcome one or both of the disadvantages above referred to.

According to the present invention there is provided the method of controlling a rail vehicle on a track which consists in applying a friction by a squeeze-pressure to retard said vehicle externally of said vehicle to at least one rail wheel below the axle thereof which pressure is greater at the rear of the wheel than at the front of the wheel according to the direction in which the vehicle is moving.

According to another aspect of the invention there is provided a squeezer rearder for a rail vehicle wherein according to the direction in which the vehicle is moving a greater squeeze-pressure is applied externally of said vehicle to the back of at least one rail wheel below the axle, than to the front thereof. The squeezer retarder may consist of squeezer rails arranged longitudinally of the track mounted on a series of caliper devices which may be actuated by springs, electro-magnetic, pneumatic or hydraulic means or by any combination of such means the caliper devices being arranged in spaced relation to each other along said squeezer rails, power selecting control means being provided whereby a greater pressure is applied to those caliper devices behind the wheel than to those in front thereof. Said squeezer rails instead of being continuous may be articulated. The control means may include devices such as mechanically operated switches, proximity switches, photo-electric cells or any such position sensing devices arranged along the track which are actuated in sequence by a wagon wheel as it moves along the track. The arrangement may be such that for the application of a varied squeeze-pressure a wave form is imparted to the squeezer rails which wave follows each wheel bringing greater pressure to bear at the rear of each wheel.

It will be seen that by always creating a slightly greater pressure at the rear edge of the wheel the tendency to lift will be largely eliminated and, in fact, an increased downward pressure of the wheel on the normal running rail may be generated in addition to the pressure due to the weight on the wheel. In ideal conditions this could allow unlimited pressure to be applied up to the strength of the materials used and since this pressure is independent of the weight of the wagon, maximum braking force could be used irrespective of the weight of the wagon without fear of lift resulting.

Referring to the accompanying drawings:

FIG. 3 is a circuit diagram of the pneumatic control mechanism;

Figure 1:
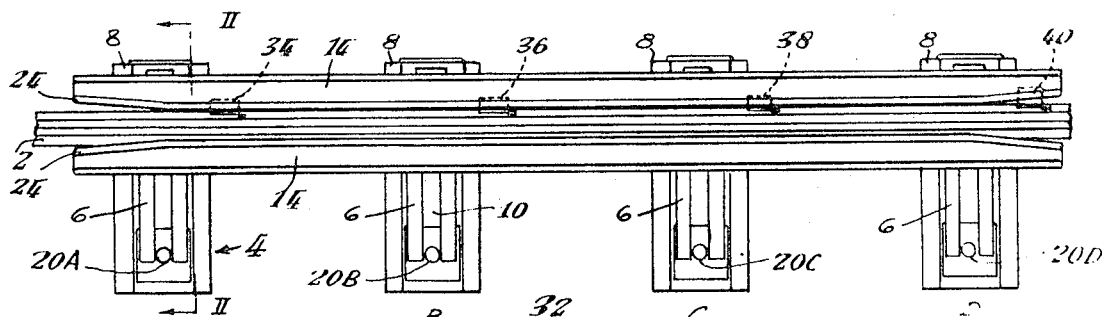
FIG. 1 is a diagrammatic plan of one form of squeezer retarder made in accordance with the present invention.
Figure 2:
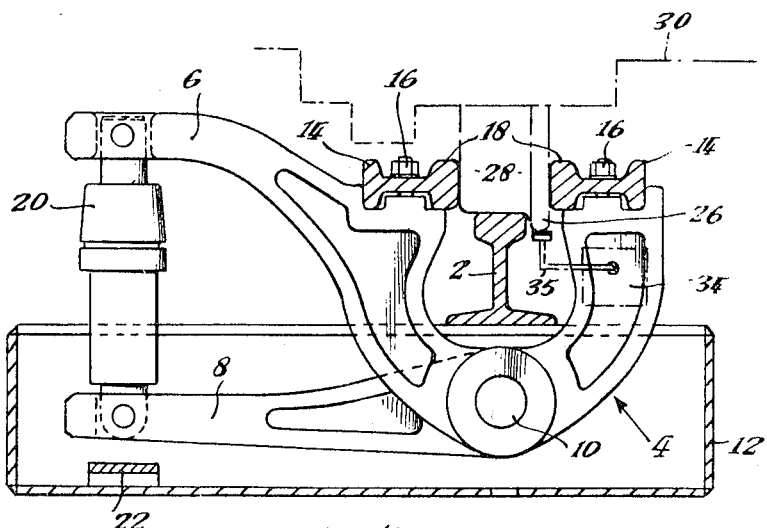
FIG. 2 is a section on the line II–II of FIG. 1, to a larger scale.

The arrangement shown in FIGS. 1 and 2 of the drawings illustrates an experimental rig arranged along a length of rail track having a gradient of 1 in 50. Only one of the rails for the wagon is shown. The assembly consists of four pairs of calipers, at stations A, B, C and D mounted on sleepers spaced at normal intervals along each main rail 2 of the track. Each of the calipers 4 comprises two arms 6 and 8 pivotally mounted on a shaft 10 supported by its ends in suitable bosses (not shown) in the casing. Each arm of the calipers is secured to one of the renewable squeezer rails 14 which are railway track rails of bull head section, by bolts 16 the heads 18 of the squeezer rails 14 facing one another. Pivotally secured to and mounted between the ends of the arms 6 and 8 is a pneumatic ram 20 arranged outside the track which ram is in this case of the double-acting type. Beneath the end of the arm 8 is a pad 22 on which the end of the arm 8 may rest when the wheel of a wagon is not between the squeezer rails 14. The pad 22 acts as a stop to prevent the arm 8 dropping too far. Except for this pad 22 the arms 6 and 8 are free to float on the pivot 10. The ends of the squeezer rails 14 are flared at 24 (FIG. 1) so that the flange 26 and tire 28 of a wagon wheel can be guided between the squeezer rails 14. The end profile of the lower part of the wagon is indicated by the chain line 30. The intended direction of traffic is indicated by the arrows 32 (FIG. 1). At each of the stations A, B, C and D on the down-line side thereof is a control switch 34, 36, 38 and 40 constituting power actuating control means respectively adapted to be contacted by the flange 26 of the wagon wheel.

Figure 4:
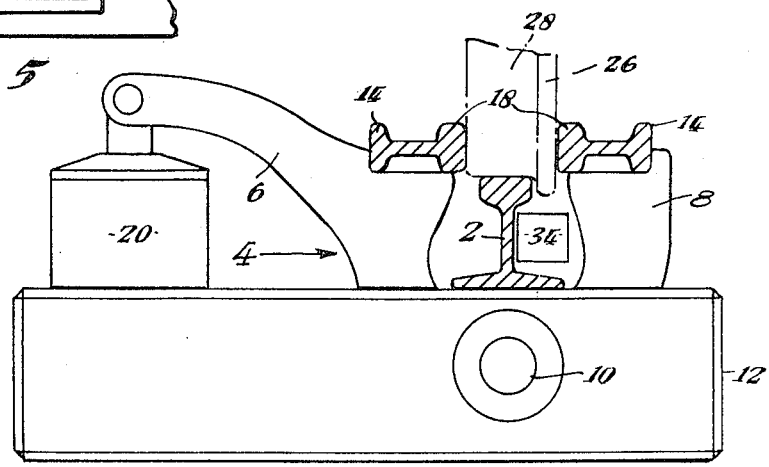
FIG. 4 is a fragmentary sectional elevation of a modified construction.

In FIG. 2 the control switch 34 is indicated in chain lines as a roller actuated track switch of which the actuating lever 35 is being contacted by the flange 26 of the metal tire 28 whilst in FIG. 4 the diagrammatically indicated control switch 34 is an electro-magnetic proximity switch which when energised is actuated by the presence of the metal flange 26 in its magnetic field. These control switches 34, 36, 38 and 40 control the admission of compressed air to the pneumatic rams 20A, 20B, 20C and 20D as will now be described with reference to FIG. 3.

The control system adopted will of course depend on the actual medium used to operate the brake but the principle remains the same. A typical block diagram of a control circuit to suit pneumatic operation is shown in FIG. 3 of the accompanying drawings. FIG. 3 shows an assembly with only four actuating cylinders but obviously the system can be extended to cover any number of actuating cylinders and in practice would in general have more than four caliper devices.

A pressure pipe line 50 from an air compressor (not shown) feeds a low pressure reservoir 52 and a high pressure reservoir 54 the former being supplied through a reducing valve 56 which drops the pressure from 120 p.s.i. to 10 p.s.i. Air pressure gauges 58 and 60 are provided for indicating the pressures. Each of the rams 20A, 20B, 20C and 20D is connected by suitable conduits to an air actuated spring return control valve 62A, B, C and D respectively in circuit with a solenoid actuated spring return control valve 64 which may be manually and/or track actuated. In the de-energised condition of the control valve 64 the control valves 62A, 62B, 62C and 62D connect the air pressure supply lines to the pneumatic rams 20A, B, C and D in such a way as to cause all the calipers to open to their fullest extent. Connected in each of the feed air pressure pipes 66A, B, C and D to the control valves 62A, B, C and D are change over air operated valves 68A, B, and C and air operated spring return valve D which, according to their position connect the control valves 62A, B, C and D respectively to the high or low pressure air supply pipe lines. The control switches 34, 36, 38 and 40 are coupled in circuit with spring return solenoid valves 74, 76, 78 and 80 which are piped to valves 68A, B, C and D as shown. With a piston area of 50.26 square inches the pressures of 120 and 10 p.s.i. apply forces of 2.7 tons and .225 ton respectively at each station to the squeezer rails 14.

In one test a four wheeled two axled wagon having the axles spaced 9 ft. apart, was released on the sloping track (gradient 1:50) to approach the squeezer retarder assembly from the left of FIG. 1. The position of the squeezer rails can be either closed under low pressure or fully opened. This can be left a matter of choice for the operator or it can be arranged to be automatic by positioning a track switch (not shown) in circuit with the solenoid valve 64 for contact by the leading wagon wheel as it approaches the squeezer retarder assembly. Obviously the low pressure selected must not be such that the advancing wagon wheel will fail to open the squeezer rails in order to obtain entry and be de-railed. For the test a low pressure of 10 lbs. sq. in. was used and this was initiated by manual operation of the switch for the solenoid valve 64. This pressure of 10 p.s.i. was chosen as it had been found to be sufficiently high to apply some effective degree of braking effort to the wagon without danger of de-railment or of preventing the wagon wheel from entering between the rails 14. After the leading wheels of the wagon have passed the centre line of the first pair of pneumatic rams 20 by about 10 inches the flange of one of the leading wheels contacted and actuated the first control switch 34 positioned alongside one of the rails of the track. It will of course be appreciated that the squeezer retarder for the test had two sets of equipment similar to that shown in FIG. 1, each set being arranged alongside one of the rails of the track and that the pairs of cylinders A, B, C and D were connected in the pneumatic circuits for simultaneous operation of each cylinder in the pair. The actuation of the first control switch 34 operated the change-over valve 68A by virtue of operation of solenoid valve 74 the effect of which was to apply high pressure air to the pair of cylinders at station A. This pressure condition continued until after the leading pair of wheels had passed the centre line of the second pair of cylinders 20B at station B and one wheel flange contacted the second control switch 36. The action of this second control switch 36 operated change-over valves 68B and 68A through operation of valve 76 which had the effect of returning cylinders 20A to low pressure, and putting cylinders 20B on full pressure. Cylinders 20A having been returned to low pressure the trailing pair of wheels of the two axle wagon seeking an entry between the squeezer rails 14 did so without being lifted from the track.

At this stage there was still some residual momentum in the wagon so that the leading pair of wheels passed on to actuate the third control switch 38 bringing cylinders 20C onto high pressure and returning cylinders 20B to low pressure. It must be realised that cylinders 20D were still on low pressure and had the wagon proceeded further these cylinders would in due course have been actuated.

It will of course be realised that the same sequence of the application of high pressure behind the wheels of the wagon would continue to be applied to the trailing pair of wheels as these in turn again actuated the first, second, third and fourth control switches in succession. In the test the wagon was brought to rest with the cylinders A and C on high pressure and the cylinder D was never put on high pressure. Using this squeezer retarder with low pressure equally applied throughout the cylinders to avoid derailment the wagon failed to stop. Likewise using only high pressure the wagon was derailed.

It will be seen from the above that the high pressure applied to the squeezer rails travels along behind each wheel as a following wave. Although only four cylinders were used in the experimental rig it is obvious that the squeezer rails can be elongated to accommodate a greater number of calipers and cylinder assemblies.

Figure 5:
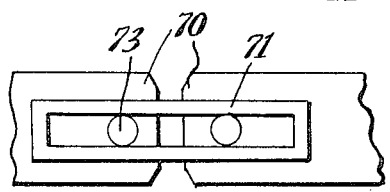
FIG. 5 is a showing of a flexible squeezer rail construction which may be used in accordance with the invention.

In the form above described and shown in FIGS. 2 and 4 the squeezer rails 14 were standard bull head railway track rails, but it is to be understood that rails of different flexibility may be selected empirically to suit requirements and if necessary in order to obtain greater flexibility the rails may be articulated, as shown in FIG. 5. With the four station arrangement, for instance, a single central articulation may be provided or separate articulations may be positioned at stations B and C. It is of course obvious that if a different number of stations is provided then different positions for articulation may be desirable.

In FIG. 5, reference character 70 identifies the squeezer rails and reference characters 71 and 72 identify linking means enabling articulation of the rails.

What I claim and desire to secure by Letters Patent is:

1. The method of controlling the progress of a vehicle wheel along a rail track, comprising applying friction force to the sides of the wheel below the wheel axle of mutually approachable elements externally of said vehicle to squeeze a part of the wheel therebetween to retard said vehicle, controlling the application at each of successive zones on the rail track of more squeezing force to those parts of said mutually approachable elements which are behind the region of contact of said wheel and rail than to those parts which are in front of said region of contact, and reducing the squeezing force in front of the next approaching wheel at those stations preceding that station at which the squeezing force is increased.

2. A railway track squeezer retarder including movable friction members arranged along said track for squeezing a vehicle wheel therebetween, a plurality of power operated actuating members connected to said movable friction members and arranged in spaced relation along said friction members, a source of power, a connection between said source of power and each said actuating member, power selecting control mechanism in each said connection and a plurality of wheel-position-sensing devices along said track connected with said control mechanisms and arranged to apply progressively along said track more pressure to the friction members behind each wheel than in front thereof, said power selecting control devices being arranged in spaced relation to each clamping means and being adapted to be contacted by the vehicle wheel after passing the associated clamping means.

3. A squeezer retarder according to claim 2 wherein the motive force for the clamping means is electromagnetic, pneumatic or hydraulic.

4. A squeezer retarder according to claim 2 wherein the clamping means comprises hinged caliper elements the extremities of the arms of which are coupled to each of said movable friction members respectively.

5. A squeezer retarder according to claim 2 wherein the said movable friction members are sufficiently flexible without being articulated to ensure that increases and decreases in the pressures are effective at the various points of application throughout their length.

6. A squeezer retarder according to claim 2 wherein said squeezer rails are made in articulated form.

7. A squeezer retarder according to claim 2 wherein said movable friction members are bull head railway track rails and the clamping means are spaced at intervals such as the standard pitch of track sleepers.

References Cited

UNITED STATES PATENTS

| | | | |
|---|---|---|---|
| 864,754 | 8/1907 | Miner | 188—62 |
| 1,806,994 | 5/1931 | Fisher. | |
| 2,129,301 | 9/1938 | Boner | 188—62 |
| 2,308,597 | 1/1943 | Fanner | 188—62 |
| 3,196,985 | 7/1965 | Rowe et al. | 188—62 |

GEORGE E. A. HALVOSA, Primary Examiner

U.S. Cl. X.R.

246—182